(12) United States Patent
Papak et al.

(10) Patent No.: US 10,467,126 B2
(45) Date of Patent: Nov. 5, 2019

(54) SCENARIOS BASED FAULT INJECTION

(71) Applicant: Microsoft Technology Licensing, LLC, Redmond, WA (US)

(72) Inventors: Dinko Papak, Issaquah, WA (US); Michail Zervos, Bellevue, WA (US); Dmitri A. Klementiev, Redmond, WA (US); Dhruv Gakkhar, Bellevue, WA (US); Varun Jain, Redmond, WA (US); LeninaDevi Thangavel, Redmond, WA (US); Igor Sakhnov, Sammamish, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 236 days.

(21) Appl. No.: 15/475,882

(22) Filed: Mar. 31, 2017

(65) Prior Publication Data
US 2018/0285239 A1  Oct. 4, 2018

(51) Int. Cl.
*G06F 11/00* (2006.01)
*G06F 11/36* (2006.01)
(Continued)

(52) U.S. Cl.
CPC ...... *G06F 11/3644* (2013.01); *G06F 11/0709* (2013.01); *G06F 11/261* (2013.01); *G06F 11/263* (2013.01)

(58) Field of Classification Search
CPC ............... H04L 1/22; H04L 2012/5621; H04L 2012/5627
See application file for complete search history.

(56) References Cited

U.S. PATENT DOCUMENTS

| 5,193,178 A | 3/1993 | Chillarege et al. |
| 5,214,653 A | 5/1993 | Elliott, Jr. et al. |

(Continued)

FOREIGN PATENT DOCUMENTS

| CN | 101894595 B | 11/2010 |
| CN | 102571498 A | 7/2012 |

(Continued)

OTHER PUBLICATIONS

Ramos, et al. "Advanced Distributed Systems", In Publication of Springer-Verlag Berlin and Heidelberg GmbH & Co. KG, Oct. 16, 2005, p. 247 of PDF containing 569 pages.

*Primary Examiner* — Bryce P Bonzo
*Assistant Examiner* — Jeison C Arcos
(74) *Attorney, Agent, or Firm* — Workman Nydegger

(57) ABSTRACT

A system determines a topology of a distributed system and determines, based on the topology, one or more injection points in the distributed system to inject failure scenarios. Each failure scenario including one or more faults and parameters for each of the faults. The system prioritizes the failure scenarios and injects a failure scenario from the prioritized failure scenarios into the distributed system via the one or more injection points. The system determines whether the injected failure scenario causes a response of the distributed system to fall below a predetermined level. The system determines resiliency of the distributed system to one or more faults in the injected failure scenario based on whether the injected failure scenario causes the response of the distributed system to fall below the predetermined level.

20 Claims, 6 Drawing Sheets

(51) Int. Cl.
*G06F 11/07* (2006.01)
*G06F 11/26* (2006.01)
*G06F 11/263* (2006.01)

(56) References Cited

U.S. PATENT DOCUMENTS

| | | | | |
|---|---|---|---|---|
| 5,796,934 | A * | 8/1998 | Bhanot | G06F 11/1474 714/15 |
| 6,748,550 | B2 * | 6/2004 | McBrearty | G06F 11/2097 714/15 |
| 7,350,113 | B2 | 3/2008 | Kearney et al. | |
| 8,046,639 | B1 | 10/2011 | Nordin et al. | |
| 9,298,525 | B2 | 3/2016 | Zhu et al. | |
| 9,454,447 | B2 | 9/2016 | Southern | |
| 2001/0032239 | A1 * | 10/2001 | Sashino | G06F 9/465 709/203 |
| 2002/0178416 | A1 * | 11/2002 | Chen | G06F 11/27 714/733 |
| 2004/0019457 | A1 | 1/2004 | Arisha | |
| 2004/0049572 | A1 * | 3/2004 | Yamamoto | G06F 11/0727 709/224 |
| 2005/0169185 | A1 * | 8/2005 | Qiu | H04L 41/145 370/241 |
| 2005/0169186 | A1 * | 8/2005 | Qiu | H04L 41/0631 370/242 |
| 2005/0204028 | A1 * | 9/2005 | Bahl | H04L 41/0873 709/223 |
| 2007/0006041 | A1 * | 1/2007 | Brunswig | G06F 11/3688 714/38.14 |
| 2008/0134160 | A1 | 6/2008 | Belapurkar et al. | |
| 2009/0094076 | A1 * | 4/2009 | Reddy | G06Q 10/04 705/7.41 |
| 2010/0019787 | A1 * | 1/2010 | Huebner | G01R 31/2834 324/762.03 |
| 2014/0280904 | A1 * | 9/2014 | Bugenhagen | H04L 43/50 709/224 |
| 2015/0161025 | A1 | 6/2015 | Baset et al. | |
| 2017/0336465 | A1 * | 11/2017 | Pignati | G01R 31/088 |
| 2017/0363685 | A1 * | 12/2017 | Douskey | G01R 31/3177 |

FOREIGN PATENT DOCUMENTS

| | | |
|---|---|---|
| CN | 104133744 A | 11/2014 |
| WO | 2000074313 A1 | 12/2000 |

* cited by examiner

SCENARIOS BASED FAULT INJECTION

FIELD

The present disclosure relates to scenarios based fault injection in distributed software systems to determine resiliency of the distributed software systems to real world failure scenarios.

BACKGROUND

The background description provided herein is for the purpose of generally presenting the context of the disclosure. Work of the presently named inventors, to the extent the work is described in this background section, as well as aspects of the description that may not otherwise qualify as prior art at the time of filing, are neither expressly nor impliedly admitted as prior art against the present disclosure.

A distributed software system is a system that comprises many components running tasks independently while appearing to the end user as one system. An example of a distributed system is a collection of cloud services responsible for storing user information, providing users with endpoints to communicate, and keeping the user information updated in order to authenticate and authorize a user to perform tasks in other systems. Since a distributed software system depends on many components, a failure in one of the components can lead to a failure in the whole system. In order to ensure that these distributed systems are more resilient, the following approaches are commonly used.

For example, in one approach, a fault model for a given system is developed. In this approach, system owners manually generate a list of scenarios that can result in the failure of the system. Once the list is complete, the system owners then inject faults according to the fault model and verify whether the system is resilient to the various failure scenarios. Another approach involves chaotically injecting faults into a system component. In this approach, system owners can inject faults which impact a random percentage of machines and monitor the system behavior to verify whether the service is resilient.

A disadvantage of both these approaches is that the service owners have to spend a significant amount of time to verify whether the system is resilient to the various failure scenarios. Further, in case of the model based approach, designing the fault model is very tedious. This can make the model based approach less effective as the system itself might have changed during the process of generating the fault model. For example, the changes may include and are not limited to code and topology changes. In case of the chaotic injection approach, only a number of machines running a component is varied. This may not be enough in determining all the failure scenarios since some failure scenarios may depend on an intensity of a fault as well.

SUMMARY

A system comprises a processor and machine readable instructions stored on a tangible machine readable medium, which when executed by the processor, configure the processor to determine a topology of a distributed system. The machine readable instructions configure the processor to determine, based on the topology, one or more injection points in the distributed system to inject failure scenarios, each failure scenario including one or more faults and parameters for each of the faults. The machine readable instructions configure the processor to prioritize the failure scenarios. The machine readable instructions configure the processor to inject a failure scenario from the prioritized failure scenarios into the distributed system via the one or more injection points. The machine readable instructions configure the processor to determine whether the injected failure scenario causes a response of the distributed system to fall below a predetermined level.

In other features, the machine readable instructions configure the processor to determine resiliency of the distributed system to one or more faults in the injected failure scenario based on whether the injected failure scenario causes the response of the distributed system to fall below the predetermined level.

In other features, the machine readable instructions configure the processor to stop injection of the failure scenario into the distributed system when the injected failure scenario causes an unexpected response from the distributed system.

In other features, the machine readable instructions configure the processor to determine the topology of the distributed system immediately prior to injecting the failure scenario into the distributed system.

In other features, the machine readable instructions configure the processor to prioritize the failure scenarios based on an analysis of one or more of prior outage of the distributed system and prior normal operation of the distributed system.

In other features, the machine readable instructions configure the processor to prioritize the failure scenarios based on prior use of the failure scenarios in a second distributed system having the topology of the distributed system.

In other features, the machine readable instructions configure the processor to determine the parameters immediately prior to injecting the failure scenario into the distributed system.

In other features, the machine readable instructions configure the processor to update the parameters based on feedback from the distributed system after injecting the failure scenario into the distributed system.

In other features, the machine readable instructions configure the processor to determine the parameters based on data collected for corresponding faults.

In other features, the machine readable instructions configure the processor to determine the parameters using parameters of a second distributed system that shares the same operating platform or depends on the same components as the distributed system.

In still other features, a method comprises determining, based on a topology of a distributed system, one or more injection points in the distributed system to inject failure scenarios, each failure scenario including one or more faults and parameters for each of the faults. The method further comprises prioritizing the failure scenarios. The method further comprises injecting a failure scenario from the prioritized failure scenarios into the distributed system via the one or more injection points. The method further comprises determining whether the injected failure scenario causes a response of the distributed system to fall below a predetermined level. The method further comprises determining resiliency of the distributed system to one or more faults in the injected failure scenario based on whether the injected failure scenario causes the response of the distributed system to fall below the predetermined level.

In other features, the method further comprises stopping injection of the failure scenario into the distributed system when the injected failure scenario causes an unexpected response from the distributed system.

In other features, the method further comprises determining the topology of the distributed system immediately prior to injecting the failure scenario into the distributed system. The method further comprises determining the parameters immediately prior to injecting the failure scenario into the distributed system.

In other features, the method further comprises prioritizing the failure scenarios based on one or more of an analysis of a prior outage of the distributed system, an analysis of prior normal operation of the distributed system, and prior use of the failure scenarios in a second distributed system having the topology of the distributed system.

In other features, the method further comprises updating the parameters based on feedback from the distributed system after injecting the failure scenario into the distributed system.

In other features, the method further comprises determining the parameters based on data collected for corresponding faults or determining the parameters using parameters of a second distributed system that shares the same operating platform or depends on the same components as the distributed system.

In still other features, a system comprises a processor and machine readable instructions stored on a tangible machine readable medium, which when executed by the processor, configure the processor to determine, based on a topology of a distributed system, one or more injection points in the distributed system to inject failure scenarios, each failure scenario including one or more faults and parameters for each of the faults. The machine readable instructions configure the processor to prioritize the failure scenarios. The machine readable instructions configure the processor to inject a failure scenario from the prioritized failure scenarios into the distributed system via the one or more injection points. The machine readable instructions configure the processor to determine resiliency of the distributed system to one or more faults in the injected failure scenario based on whether the injected failure scenario causes a response of the distributed system to fall below a predetermined level.

In other features, the machine readable instructions configure the processor to stop injection of the failure scenario into the distributed system when the injected failure scenario causes an unexpected response from the distributed system.

In other features, the machine readable instructions configure the processor to determine the topology of the distributed system immediately prior to injecting the failure scenario into the distributed system and to determine the parameters immediately prior to injecting the failure scenario into the distributed system.

In other features, the machine readable instructions configure the processor to prioritize the failure scenarios based on an analysis of a prior outage of the distributed system or based on usage of the failure scenarios in a second distributed system having the topology of the distributed system.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF DRAWINGS

In the drawings, reference numbers may be reused to identify similar and/or identical elements.

DESCRIPTION

Figure 1A:
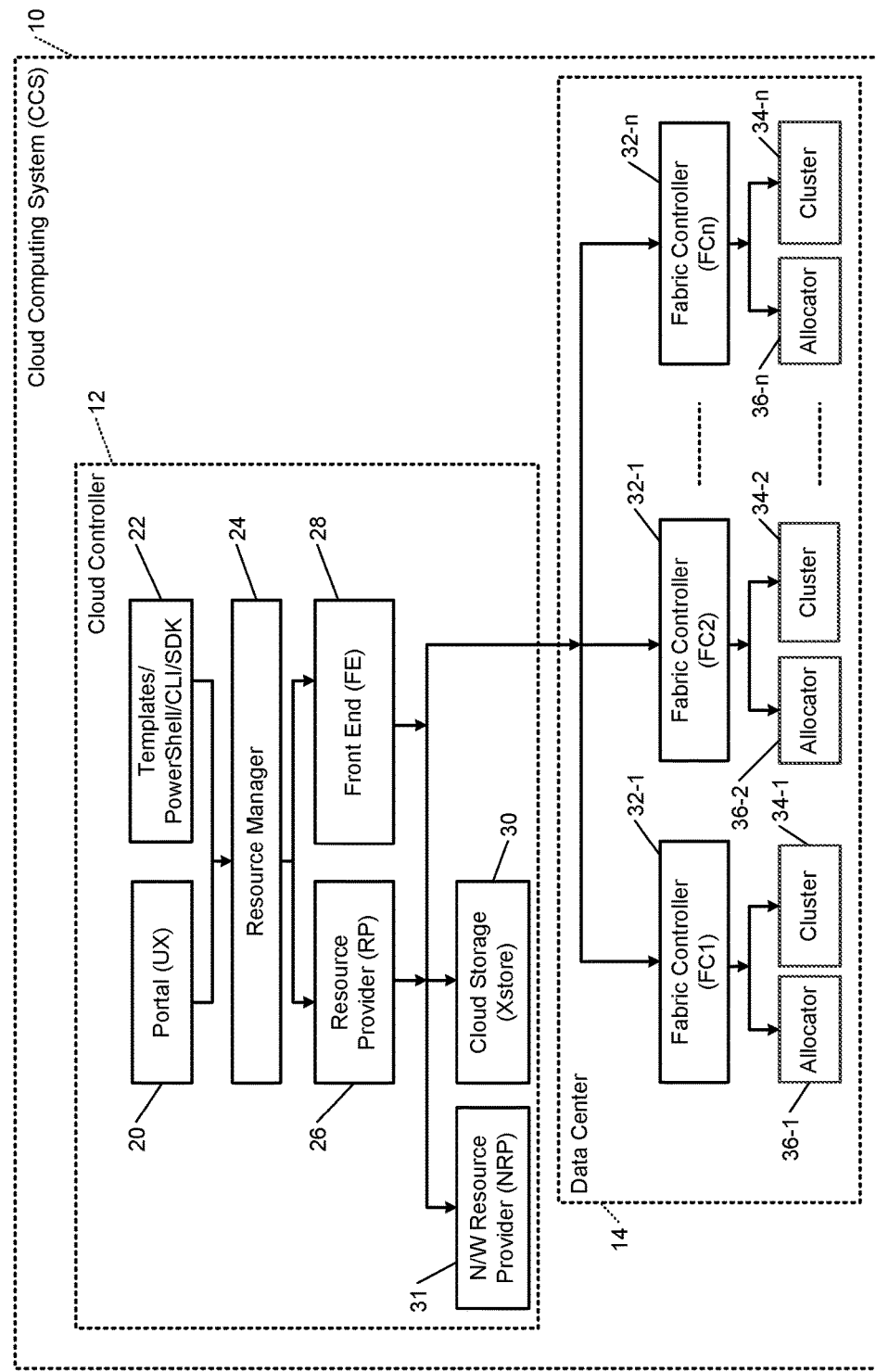
FIG. 1A is a functional block diagram of a simplified example of a cloud computing system that can be used to deploy distributed software systems and a failure scenario based injection system according to the present disclosure.

The present disclosure proposes an approach to find weak points (defined below) of a target system (a distributed software system or application) in a limited time. The proposed approach involves injecting failure scenarios into the target system. Every injected failure scenario relates to a real world problem that the target system might encounter including but not limited to high CPU utilization, loss of network connectivity with target system dependencies, excessive hard disk utilization, bugs in code, process kill, process restarts, corrupted files, excessive memory utilization, and so on. Each failure scenario can include one or more faults, and each fault may have one or more parameters. A weak point is when the performance of the target system falls below a predetermined acceptable level in response to injecting a failure scenario. Stated differently, a weak point is where the target system is least resilient to one or more faults in the injected failure scenario.

In order to find weak points in the target system in a limited time, the proposed approach determines injection target, fault parameters, and priority of failure scenarios. A custom package of failure scenarios is created for every target system based on the answers to these three questions: 1) where to inject failure scenarios, 2) what failure scenarios and parameters to inject, and 3) how to prioritize the failure scenarios. The custom package accounts for any possibilities that the target system might inherently be immune to some of the failure scenarios, or to the intensity and/or duration of a failure scenario. For example, the impact of a failure scenario involving loss of power in one node is different for a target system consisting of only one node compared to a target system comprising hundreds of nodes. Further, the system and method according to the present disclosure is easy to use and does not require expert knowledge. A user may rely on default selections or may select failure scenarios provided by the system and inject them with expert knowledge of the system. These and other aspects of the present disclosure are described below in detail.

Throughout the present disclosure, a cloud-based computing environment is used as an example for illustrative purposes only. The teachings of the present disclosure apply equally to any other computing environment capable of hosting distributed software systems. Examples of other computing environments include but are not limited to on-premises computing environments, client-server computing environments, and so on. Accordingly, the failure scenarios based injection systems and methods according to the present disclosure may be deployed in the form of software-as-a-service (SaaS) in a cloud-based computing environment as well as an application in any other computing environment.

The present disclosure is organized as follows. As an example of an environment in which the system and method of the present disclosure can be implemented, a general architecture of a cloud computing system is initially presented with reference to FIGS. 1A-1C. For example, the cloud computing system can run a distributed software system and can implement the system and method of the present disclosure in the form of software-as-a-service (SaaS). Subsequently, a detailed description of the system and method and its technical effects are presented. The method is then described with reference to a flowchart shown in FIG. 2. In FIGS. 3A-5, a simplified example of a distributed network system is presented that can implement the cloud computing system. The distributed network system can also run a distributed software system and can implement the system and method of the present disclosure by itself (i.e., without any cloud-based implementation).

FIG. 1A shows a simplistic example of a cloud computing system (CCS) 10 according to the present disclosure. The cloud computing system 10 includes a cloud controller 12 and at least one data center 14. While only one data center 14 is shown for simplicity, the cloud controller 12 can interface with a plurality of data centers. Further, while the data center 14 is shown as being local to the cloud controller 12, one or more data centers may be geographically remote from the cloud controller 12, may be located in different geographic locations (e.g., in different time zones, different countries or continents, and so on), and may communicate with the cloud controller 12 via various networks. The cloud controller 12 controls one or more data centers 14.

Each data center 14 includes a plurality of fabric controllers 32-1, 32-2, . . . , and 32-n (collectively fabric controllers 32) and corresponding clusters 34-1, 34-2, . . . , and 34-n (collectively clusters 34). Each fabric controller 32 controls a respective cluster 34. Each cluster 34 includes a plurality of racks (shown in FIGS. 1B and 1C), and each rack includes a plurality of nodes (shown in FIGS. 1B and 1C), which are also called servers, hosts, or machines throughout the present disclosure. Each fabric controller 32 is associated with an allocator 36 that allocates resources within the cluster 34 for instances of customer services hosted on the cluster 34.

The cloud controller 12 includes a portal 20 and a software development kit (SDK) 22 that the customers can use to select resources and request service deployment. The cloud controller 12 further includes a cloud resource manager 24, a compute resource provider 26, and a front-end 28. The front-end 28 interfaces with the fabric controllers 32 of one or more data centers 14. The cloud resource manager 24 receives the customer selections and forwards the customer selections to the compute resource provider 26. The compute resource provider 26 generates a tenant model based on the customer selections. The compute resource provider 26 provisions resources to the customer services according to the tenant model generated based on the customer selections. The compute resource provider 26 provisions storage, networking, and computing resources by interfacing with a cloud storage (Xstore) 30, a network resource provider 31, and the fabric controllers 32. One or more virtual machines (VMs) may be deployed in a cluster 34 based on the tenant model.

Figure 1C:
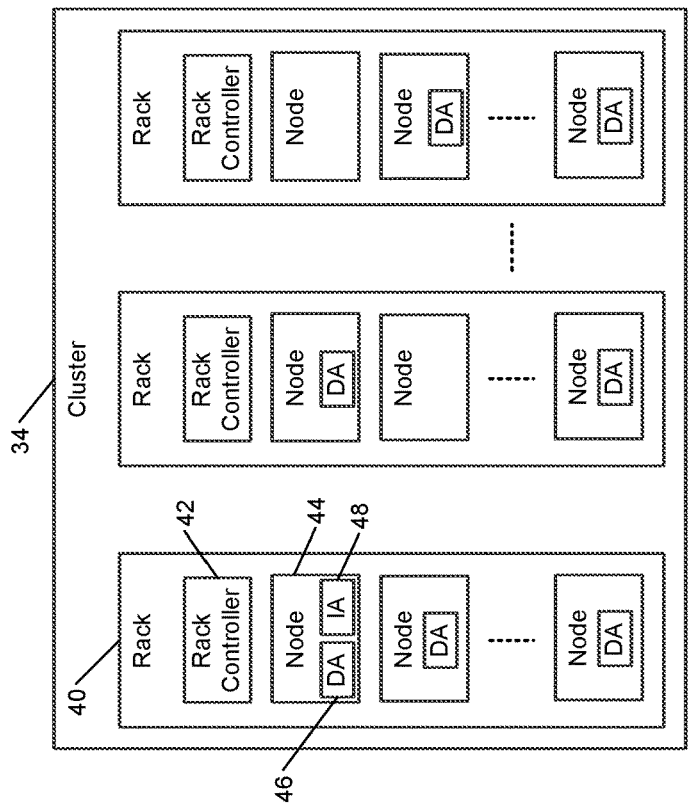
FIG. 1C shows an example of the cluster shown in FIG. 1B running a distributed application and an injection application according to the present disclosure.
Figure 1B:
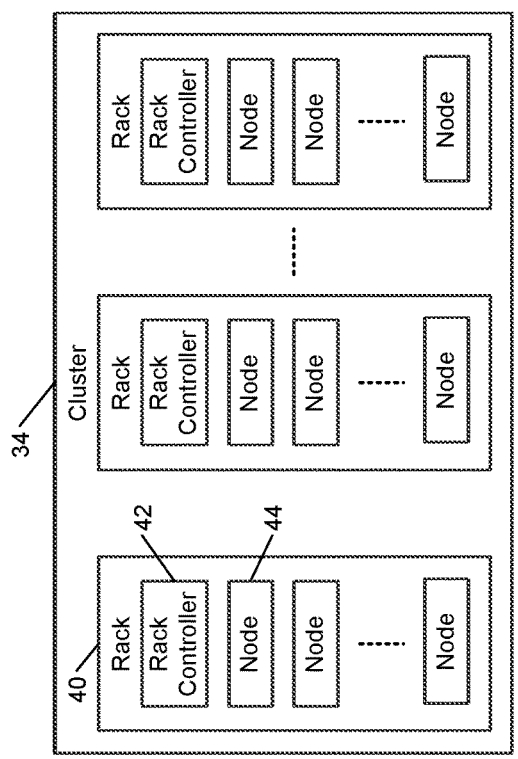
FIG. 1B is a functional block diagram of a simplified example of a cluster shown in FIG. 1A.

FIG. 1B shows an example of a cluster (e.g., the cluster 34 shown in FIG. 1A). Each cluster 34 includes the plurality of racks 40. Each rack 40 includes a rack controller 42 and a plurality of nodes 44.

In FIG. 1C, one or more distributed software systems (shown as distributed application (DA) 46) may be provisioned on the CCS 10. For example, the DA 46 may run on several nodes 44. Additionally, the scenarios based injection system (shown as injection application (IA) 48) according to the present disclosure may also be provisioned on the CCS 10. For example, the IA 48 may run on one of the nodes 44. Fault scenarios can only be injected by the injection application. The scenarios based injection system can identify weak points of the distributed software systems as described in further detail below. One way to think of a weak point of a distributed software system is that the weak point is a point of failure in the distributed software system that can have the most, significant, maximum, or maximum impact on the performance of the distributed software system. Some distributed software system may have a single point of failure, which is always the weak point of that system.

The method according to the present disclosure proposes injecting a failure scenario comprising one or more faults instead of injecting a single fault and identifying weak points of a distributed system in a limited time. The method includes determining where to inject the failure scenarios in a target distributed system, what failure scenarios to inject and with what parameters, and how to prioritize these failure scenarios.

In order to determine where to inject, the method includes discovering a topology of the target distributed system. The topology information includes but is not limited to a number of nodes, an operating platform being used to host these nodes, and so on. The operating platform of the target system may provide APIs to determine the number of nodes and so on. The method includes calling these APIs just before injecting the failure scenarios because the topology of a distributed system can change frequently due to auto-scaling, new deployment, and so on. Finding where to inject at or near the actual time of injection helps find the most recent topology of the target system, which in turns makes actual injection more near to what is expected.

Each of the failure scenarios can comprise one or more faults such as network disconnect between two endpoints, CPU pressure, process kill, code faults, and so on. Further, different failure scenarios might use the same faults but with different parameters and intensity. To inject failure scenarios in different target systems, the parameters may have to be different depending on the constituent faults of the failure scenario. For Example, loss of network connectivity with target system dependencies may involve network disconnect fault between the target system nodes and the target system dependencies. These dependencies may be specific to the target system.

For example, one failure scenario may include the target system losing dependency to one or more endpoints. For instance, suppose that the target system depends on endpoints A, B, and C. A failure scenario may include disconnecting the target system from only endpoint A, all the endpoints, or only endpoints B and C. The impact of each failure scenario on the target system can be examined by monitoring the response of the target system to each failure scenario.

As another example, suppose that the target system is writing files to a hard disk. A failure scenario may include crashing the hard disk or making the hard disk full. The impact of the failure scenario on the target system can be examined by monitoring the response of the target system to the failure scenario.

As another example, suppose that the memory usage and/or CPU usage of the target system is approximately 50% on each of some of the nodes. A failure scenario may include increasing the memory usage and/or CPU usage to say 80%. The impact of the failure scenario on the target system can be examined by monitoring the response of the target system to the failure scenario. As another example, a failure scenario may include powering down for a short period of time and then restarting different number of nodes on which target system is running and monitoring the response of the system as the different number of nodes goes down for a period and then restarts.

Note that the failure scenarios depend on some faults. Changing parameters of the faults can present new failure scenarios. For example, one failure scenario may include a small percentage of nodes being down for a short period of time. Increasing the duration for which the nodes are down creates a different failure scenario having a different impact on the target system. As another example, in one failure scenario, the nodes, clusters, and/or storage or networking resources that are down may be within the same data center. Bringing down nodes, clusters, and/or storage or networking resources in different data centers presents a different failure scenario; and so on.

In general, the dependencies of the target system can be identified and can be turned off in a controlled manner to see how turning them off impacts the performance of the target system. Note that after monitoring the response of the target system to a failure scenario, the failure scenario can be increased in intensity to a predetermined limit (e.g., to an acceptable level of performance degradation if the target system is user-facing), the failure scenario can be stopped altogether if the target system responds in an unexpected manner (e.g., sends alerts that do not correspond to the failure scenario), and the original status prior to injecting the failure scenario is restored.

In some instances, the target system may have built-in mechanisms to respond to a failure scenario. For instance, a failure scenario may include corrupting a file on a hard disk used by the target system. The target system, however, may be designed to keep a backup of the file anticipating a corruption and will revert to the backup file when the failure scenario corrupts the file. Accordingly, if the target system works as designed, the response of the target system to the file corruption caused by the failure scenario may not indicate that corrupting the file is a weak point of the target system. However, the failure scenario and verify if in fact the target system works as designed.

Another example of such built-in mechanisms is failing over to a second data center when a first data center goes down. By injecting a failure scenario that makes the first data center unavailable, whether the target system in fact fails over to the second data center can be tested. For instance, the failover may not occur due to deployment of an incorrect configuration, in which case injecting the above failure scenario can not only detect that the target system failed to fail over to the second data center but can also determine whether the dependency of the target system to fail over to the second data center is the weak point of the target system.

Note that the failure scenarios can include more than one fault. For example, suppose that the target system depends on A and B. A failure scenario can include disconnecting the target system from A and introducing a high latency between the target system and B at the same time. Accordingly, the failure scenario does not include only one fault (disconnecting the target system from A) but instead includes two faults (disconnecting the target system from A and introducing a high latency between the target system and B). Also note that a failure scenario is not the same as a fault. A failure is what a fault may induce but may not occur after the fault is injected. A failure is a real problem in a system that can occur due to a fault.

As another example, a failure scenario can include momentary loss of power at a data center, following which, the nodes restart but some of the networking gear experiences hardware failure. This failure scenario also includes two faults: loss of power for a short period of time and network failure. One skilled in art can appreciate that there can be many more such examples where a failure scenario can include multiple faults at the same time.

Now determining parameters of the faults in the failure scenarios is described in detail. Different approaches can be used to determine the parameters for these faults. These approaches include but are not limited to statistical, heuristic, and feedback based approaches, which are explained below in turn.

In the statistical approach, data for the corresponding fault is collected during run time of the target system and is analyzed to derive the corresponding parameters. Examples of this approach include but are not limited to the following. In one example, network traffic is analyzed to determine endpoints with characteristics such as lowest/highest volume, the lowest/highest speed, or properties of a particular protocol and so on. Based on this analysis, two or more end points with the highest traffic volume can be the parameters for the failure scenario that may be called loss of network connectivity with target system dependencies.

In another example, performance counters of a node of the target system are analyzed to determine the maximum CPU usage on those nodes. The maximum CPU usage can then be injected in the nodes to simulate an excessive CPU usage failure scenario. For example, in the excessive CPU usage failure scenario, the processors on these nodes can be made to execute a process including increased number of threads and timeouts in loops that excessively increase the CPU pressure. Similar failure scenarios involving excessive memory usage can be implemented on disk drives as well as physical and virtual memories.

For example, the file system of the target system can be analyzed to determine most frequently written and/or read files, and then deleting or corrupting those files, which creates a failure scenario. The memory of the nodes running the target system can be analyzed to determine applications/process that allocate/deallocate a lot of the memory. Based on this analysis, appropriate amount of memory pressure can be injected. Alternatively, the application/process can be killed. The application/process can be analyzed for number of threads. Based on the analysis, an appropriate amount of CPU pressure can be injected.

In other examples, the CPU usage by a process on the nodes of the target system can be analyzed to determine the process to kill or to make the process dysfunctional, which creates a failure scenario. The main application/process of the target system can be analyzed to determine the most used code path and injecting exceptions into the most used code path, which creates a failure scenario. Many other examples are contemplated and will become apparent to one skilled in the art after reviewing the present disclosure. In summary, in the statistical approach, data is collected and analyzed to derive parameters for creating different failure scenarios that could include combinations of different faults.

In the heuristic based approach, the fact that the target systems typically execute on the same operating platform (e.g., the cloud computing system 10 shown in FIG. 1) or depend on similar components can be exploited to use the same parameters for different target systems. For example, each target system running on the cloud computing system 10 will use some common dependencies such as some processes that bootstrap into each target system. Accordingly, if one of these common processes is killed as part of a particular failure scenario for one target system, that failure scenario can also be used with other target systems since that failure scenario will have a similar impact on the other target systems running on the same operating platform. In other words, some dependencies such as these bootstrap processes, storage, DNS servers can be common between the target systems running on the same operating platform and can be parameters of failure scenarios that can be injected into the target systems running on the same operating platform. Note that these parameters are more specific than those obtained using the statistical based approach described above.

In the feedback based approach, fault parameters are updated based on the feedback received from the target system in response to injecting failure scenarios created using heuristic or statistical approach. Initially either heuristic or statistical approach is used to determine parameters for failure scenarios. The failure scenarios are then injected, and a metric or signal is used to determine whether a weak point was discovered. If a weak point is not discovered, then a different statistical approach can be used to determine the parameters for the failure scenario. The iterations for parameter selection can continue till a weak point is identified or be limited by count.

For example, suppose that the target system depends on A, B, and C. Using a failure scenario, suppose that the target system is disconnected from A. Suppose further that disconnecting the target system from A does not noticeably impact the target system. In that case, the severity or intensity of one or more faults in the failure scenario can be increased or some other faults are added to the failure scenario to worsen the operating condition for the target system. Alternatively, if the target system used an alternate resource upon disconnecting from A (e.g., failed over to another data canter), then that alternate resource is included in the next failure scenario injection.

Note that in each approach, the values of these parameters are computed during run time just before the actual injection because of the dynamic nature of the target system. For example, after the user selects a failure scenario and proceeds with injection, the method of the present disclosure checks the current operating status (most recent connections to dependencies and so on) of the target system at that time (i.e., after the user proceeds with injection), derives the requisite parameter values (e.g., focuses on data center to which the target system has just now failed over), and performs the injection. Computing the values just before actual injection helps in finding the values of fault parameters based on the latest behavior of the target system and helps inject a more meaningful fault.

Now prioritizing the failure scenarios is described. In order to find the weak points of the target system in a limited time, the failure scenarios can be prioritized based on heuristics or target system preferences. One way is to analyze previous outages and/or normal operation of the target system and based on the analysis prioritize the failure scenario. Another approach is to use failure scenarios which were used successfully to determine the weak points in another system having similar topology as the targeted system. Many different approaches can be devised using other learning techniques.

Figure 2:
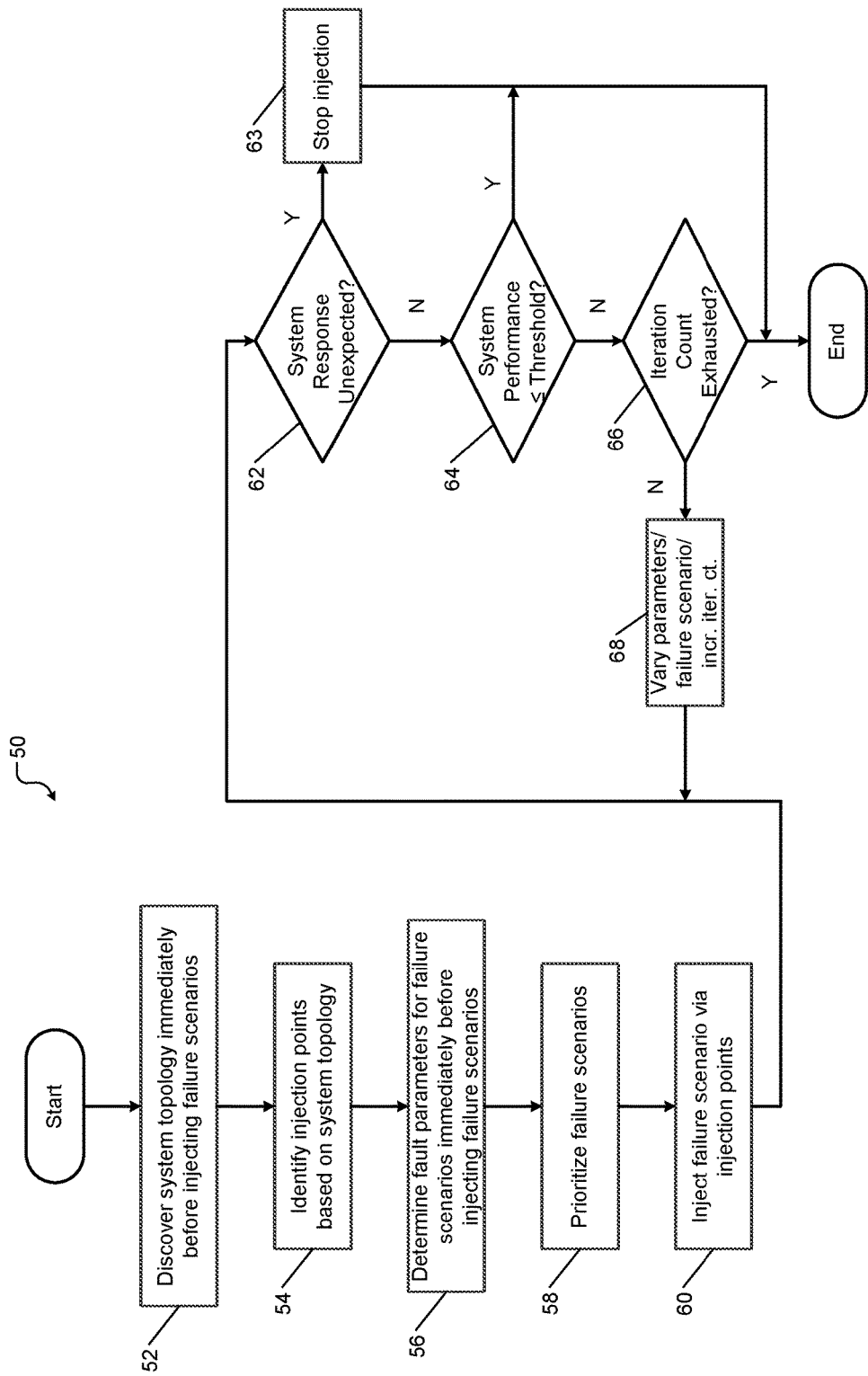
FIG. 2 is a flowchart illustrating an example of a method for determining resilience of a distributed software system using a failure scenario based injection system according to the present disclosure.

FIG. 2 shows a method 50 for finding a weak point (i.e., determining resilience) of a distributed system by injecting failure scenarios comprising faults and associated parameters. In the following description, the term control refers to one or more of the injection application (IA) 48, server applications 186, or client application 166 described below with reference to FIGS. 3A-5. In other words, the term control as used in the description of the method 50 below represents code or instructions executed by one or more components of the server 130 or the client device 120 shown in FIGS. 3A-5 or by one of the nodes 44 shown in FIGS. 1B and 1C to perform the described functionality.

At 52, control discovers the topology of the target system immediately prior to injecting the failure scenarios into the target system (i.e., during runtime). At 54, based on the topology of the target system, control identifies the injection points at which to inject the failure scenarios. At 56, control determines fault parameters for the failure scenarios immediately prior to injecting the failure scenarios into the target system as described above in detail (i.e., during runtime). At 58, control prioritizes the failure scenarios prior to injecting the failure scenarios into the target system as described above. At 60, control selects a failure scenario from the prioritized failure scenarios that is most likely to find a weak point of the target system and injects the selected failure scenario into the target system via the identified injection points.

At 62, control determines whether the target system responds to the injected failure scenario in an unexpected manner (e.g., by sending alerts that do not correspond to the failure scenario or by exhibiting any other abnormal or extreme behavior). At 63, if the target system responds to the injected failure scenario in an unexpected manner, control immediately stops the injection of the failure scenario and restores the resources involved in the injection to their pre-injection statuses, and control ends.

At 64, if the target system does not respond to the injected failure scenario in an unexpected manner, control determines whether the system performance falls below a predetermined threshold in response to the injected failure scenario. If the system performance falls below a predetermined threshold, the injected failure scenario causing the system performance to fall below the predetermined threshold indicates the weak point of the target system, and control ends.

At 66, if the system performance does not fall below a predetermined threshold, the weak point of the target system is not yet found, and control determines whether a preset maximum iteration count is exhausted. At 68, if a preset maximum iteration count is not yet exhausted, control can update/vary fault parameters of the injected failure scenario, change the faults in the injected failure scenario, or select a next failure scenario from the prioritized failure scenarios. Additionally, control increments iteration count (which, while not shown, may be initialized at 60), and control returns to 62. Otherwise, if no weak point is found after the preset maximum iteration count is exhausted, control ends.

The failure scenarios based injection system and method described in the present disclosure are not as tedious as the model based system since the method of the present disclosure does not involve developing and maintaining fault models and associated costs. Instead, the parameters of the failure scenarios and the topology of the target system are computed every time before injection. The method of the present disclosure is also better than a system based on chaotically injecting faults because in addition to varying the number of machines, the parameters of the fault scenarios are also varied. Further, unlike either approaches, the method of the present disclosure prioritizes the failure scenarios to reduce the time to find the weak points of the target system. This may not be possible while injecting faults chaotically to the system. The method of the present disclosure can also be used to find weak points associated with other issues including but not limited to performance, security, and so on, in addition to the resiliency of the target system by injecting failure scenarios related to those issues.

Below are simplistic examples of a distributed computing environment in which the systems and methods of the present disclosure can be implemented. Throughout the description, references to terms such as servers, client devices, applications and so on are for illustrative purposes only. The terms servers and client devices are to be understood broadly as representing computing devices comprising one or more processors and memory configured to execute machine readable instructions. The terms applications and computer programs are to be understood broadly as representing machine readable instructions executable by the computing devices.

Figure 3B:
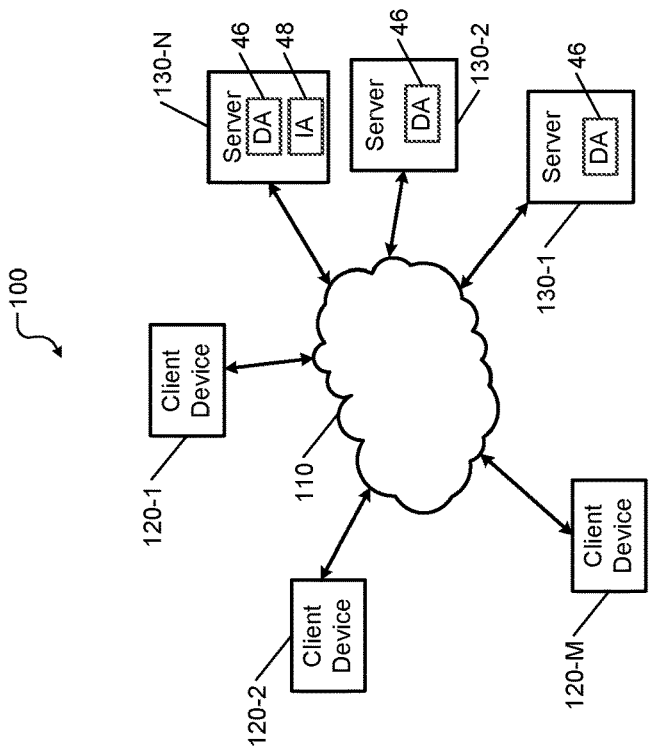
FIGS. 3B and 3C show examples of the distributed network system shown in FIG. 3A running a distributed application and an injection application according to the present disclosure.
Figure 3A:
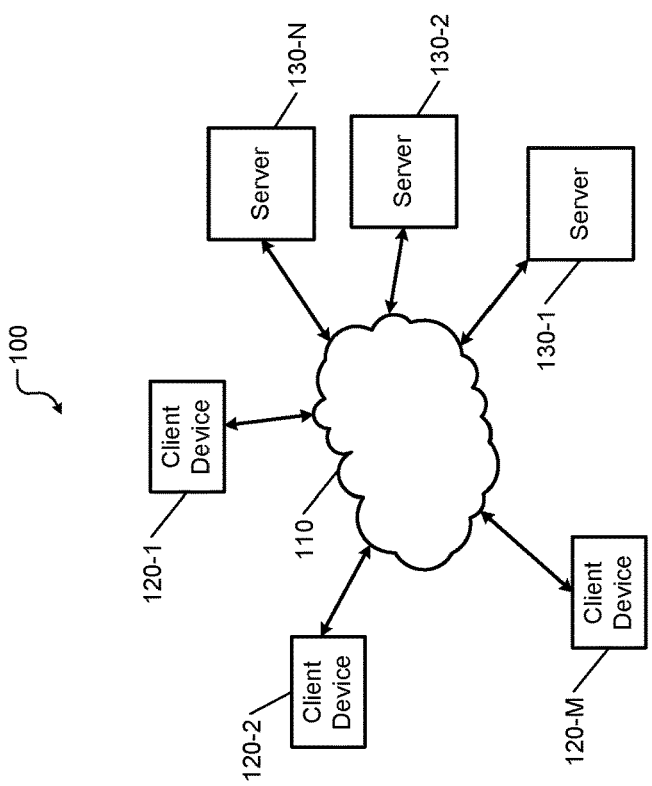
FIG. 3A is a functional block diagram of a simplified example of a distributed network system to implement the cloud computing system of FIG. 1 and to host a distributed software system and a failure scenario based injection system according to the present disclosure.
Figure 3C:
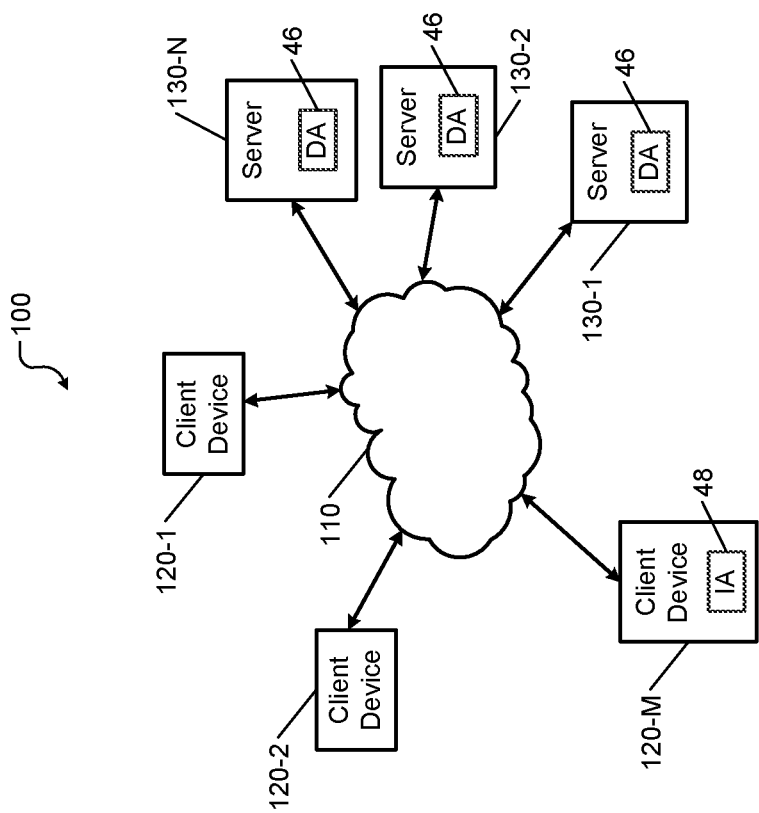

FIG. 3A shows a simplified example of a distributed network system 100. The distributed network system 100 includes a network 110, one or more client devices 120-1, 120-2, . . . , and 120-M (collectively client devices 120) (where M is an integer greater than or equal to one), and one or more servers 130-1, 130-2, . . . , and 130-N (collectively servers 130) (where N is an integer greater than or equal to one). The network 110 may include a local area network (LAN), a wide area network (WAN) such as the Internet, or other type of network (collectively shown as the network 110). The client devices 120 communicate with one or more of the servers 130 via the network 110. The client devices 120 and the servers 130 may connect to the network 110 using wireless and/or wired connections to the network 110.

For example, the client devices 120 may include smartphones, personal digital assistants (PDAs), laptop computers, personal computers (PCs), and so on. The servers 130 may provide multiple services to the client devices 120. For example, in FIG. 3B, the servers 130 may execute a plurality of software applications developed by one or more software vendors, including distributed software systems (shown as distribution application (DA) 46) and the scenarios based injection system (shown as injection application (IA) 48) according to the present disclosure. Alternatively, for example, in FIG. 3C, the servers 130 may execute a plurality of software applications developed by one or more software vendors, including distributed software systems (shown as distribution application (DA) 46), and one of the client devices 120 may execute the scenarios based injection system (shown as injection application (IA) 48) according to the present disclosure. The servers 130 may host multiple databases that are utilized by the plurality of software applications and that are used by users of the client devices 120.

One or more of the servers 130 may be located on-premises and/or in a cloud computing system (e.g., CCS 10 shown in FIG. 1A) provided by a cloud provider. One or more of the servers 130 and one or more of the client devices 120 may also be used to implement the cloud computing system (e.g., CCS 10 shown in FIG. 1A) provided by the cloud provider. For example, the servers 130 may implement the nodes 44 shown in FIGS. 1B and 1C.

Figure 4:
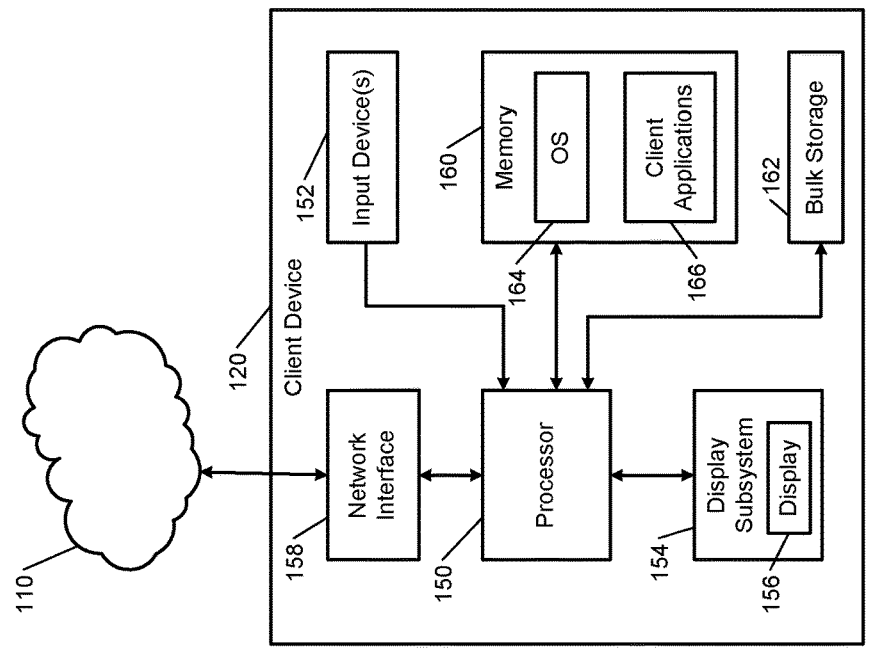
FIG. 4 is a functional block diagram of a simplified example of a client device used in the distributed network system of FIGS. 3A-3C.

FIG. 4 shows a simplified example of a client device 120 that is representative of the client devices 120 (hereinafter the client device 120). The client device 120 may typically include a central processing unit (CPU) or processor 150, one or more input devices 152 (e.g., a keypad, touchpad, mouse, and so on), a display subsystem 154 including a display 156, a network interface 158, a memory 160, and a bulk storage 162.

The network interface 158 connects the client device 120 to the distributed network system 100 via the network 110. For example, the network interface 158 may include a wired interface (e.g., an Ethernet interface) and/or a wireless interface (e.g., a Wi-Fi, Bluetooth, near field communication (NFC), or other wireless interface). The memory 160 may include volatile or nonvolatile memory, cache, or other type of memory. The bulk storage 162 may include flash memory, a hard disk drive (HDD), or other bulk storage device.

The processor 150 of the client device 120 executes an operating system (OS) 164 and one or more client applications 166. The client applications 166 include an application to connect the client device 120 to the server 130 via the network 110. Additionally, the client applications 166 may include the injection application (IA) 48. The client device 120 accesses one or more applications executed by the server 130 via the network 110.

Figure 5:
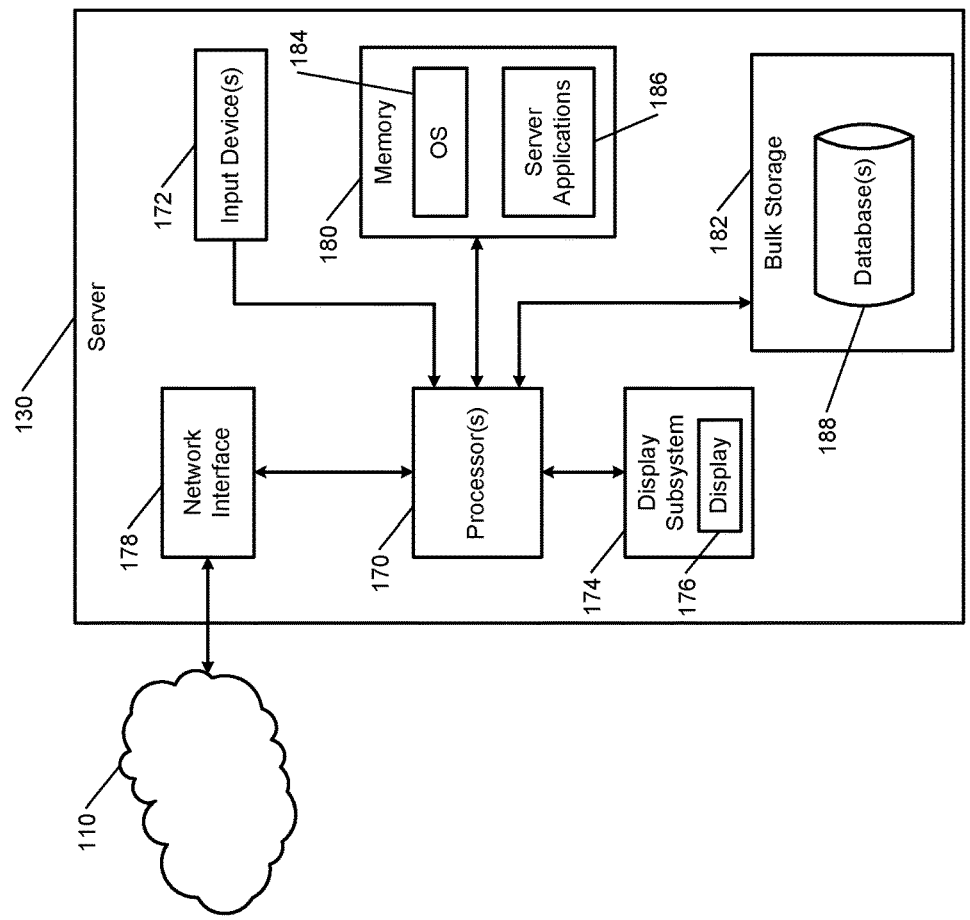
FIG. 5 is a functional block diagram of a simplified example of a server used in the distributed network system of FIGS. 3A-3C.

FIG. 5 shows a simplified example of a server 130 that is representative of the servers 130 (hereinafter the server 130). The server 130 typically includes one or more CPUs or processors 170, one or more input devices 172 (e.g., a keypad, touchpad, mouse, and so on), a display subsystem 174 including a display 176, a network interface 178, a memory 180, and a bulk storage 182.

The network interface 178 connects the server 130 to the distributed network system 100 via the network 110. For example, the network interface 178 may include a wired interface (e.g., an Ethernet interface) and/or a wireless interface (e.g., a Wi-Fi, Bluetooth, near field communication (NFC), or other wireless interface). The memory 180 may include volatile or nonvolatile memory, cache, or other type of memory. The bulk storage 182 may include flash memory, one or more hard disk drives (HDDs), or other bulk storage device.

The processor 170 of the server 130 executes an operating system (OS) 184 and one or more server applications 186. The server applications 186 include distributed software systems (e.g., the DA 46) and the scenarios based injection application (e.g., the IA 48) according to the present disclosure and other applications to implement the systems and methods described above. Additionally, the server applications 186 include applications to implement the cloud functionalities described above. The bulk storage 182 may store one or more databases 188 that store data structures used by the server applications 186 to perform respective functions.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules, circuit elements, semiconductor layers, etc.) are described using various terms, including "connected," "engaged," "coupled," "adjacent," "next to," "on top of," "above," "below," and "disposed." Unless explicitly described as being "direct," when a relationship between first and second elements is described in the above disclosure, that relationship can be a direct relationship where no other intervening elements are present between the first and second elements, but can also be an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean "at least one of A, at least one of B, and at least one of C."

In the figures, the direction of an arrow, as indicated by the arrowhead, generally demonstrates the flow of information (such as data or instructions) that is of interest to the illustration. For example, when element A and element B exchange a variety of information but information transmitted from element A to element B is relevant to the illustration, the arrow may point from element A to element B. This unidirectional arrow does not imply that no other information is transmitted from element B to element A. Further, for information sent from element A to element B, element B may send requests for, or receipt acknowledgements of, the information to element A.

The term memory is a subset of the term computer-readable medium or machine-readable medium. The term computer-readable medium or machine-readable medium, as used herein, does not encompass transitory electrical or electromagnetic signals propagating through a medium (such as on a carrier wave); the term computer-readable medium or machine-readable medium may therefore be considered tangible and non-transitory. Non-limiting examples of a non-transitory, tangible computer-readable medium or machine-readable medium are nonvolatile memory circuits (such as a flash memory circuit, an erasable programmable read-only memory circuit, or a mask read-only memory circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

In this application, apparatus elements described as having particular attributes or performing particular operations are specifically configured to have those particular attributes and perform those particular operations. Specifically, a description of an element to perform an action means that the element is configured to perform the action. The configuration of an element may include programming of the element, such as by encoding instructions on a non-transitory, tangible computer-readable medium associated with the element.

The apparatuses and methods described in this application may be partially or fully implemented by a special purpose computer created by configuring a general purpose computer to execute one or more particular functions embodied in computer programs. The functional blocks, flowchart components, and other elements described above serve as software specifications, which can be translated into the computer programs by the routine work of a skilled technician or programmer.

The computer programs include processor-executable instructions that are stored on at least one non-transitory, tangible computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language), XML (extensible markup language), or JSON (JavaScript Object Notation) (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C#, Objective-C, Swift, Haskell, Go, SQL, R, Lisp, Java®, Fortran, Perl, Pascal, Curl, OCaml, Javascript®, HTML5 (Hypertext Markup Language 5th revision), Ada, ASP (Active Server Pages), PHP (PHP: Hypertext Preprocessor), Scala, Eiffel, Smalltalk, Erlang, Ruby, Flash®, Visual Basic®, Lua, MATLAB, SIMULINK, and Python®.

None of the elements recited in the claims are intended to be a means-plus-function element within the meaning of 35 U.S.C. § 112(f) unless an element is expressly recited using the phrase "means for," or in the case of a method claim using the phrases "operation for" or "step for."

What is claimed is:

1. A system comprising:
    a processor; and
    machine readable instructions, stored on a tangible machine readable medium, when executed by the processor, configure the processor to:
        determine a topology of a distributed system;
        determine, based on the topology, one or more injection points in the distributed system to inject failure scenarios, each failure scenario including one or more faults and parameters for each of the faults;
        prioritize the failure scenarios, wherein prioritizing the failure scenarios is based on a prior use of the failure scenarios in a second distributed system having a second topology that shares common characteristics to that of the topology of the distributed system;
        inject a failure scenario from the prioritized failure scenarios into the distributed system via the one or more injection points; and
        determine whether the injected failure scenario causes a response of the distributed system to fall below a predetermined level.

2. The system of claim 1 wherein the machine readable instructions configure the processor to determine resiliency of the distributed system to one or more faults in the injected failure scenario based on whether the injected failure scenario causes the response of the distributed system to fall below the predetermined level.

3. The system of claim 1 wherein the machine readable instructions configure the processor to stop injection of the failure scenario into the distributed system when the injected failure scenario causes an unexpected response from the distributed system.

4. The system of claim 1 wherein the machine readable instructions configure the processor to determine the topology of the distributed system immediately prior to injecting the failure scenario into the distributed system.

5. The system of claim 1 wherein the machine readable instructions configure the processor to prioritize the failure scenarios based on an analysis of one or more of prior outage of the distributed system and prior normal operation of the distributed system.

6. The system of claim 1, wherein the second topology is the same as the topology of the distributed system.

7. The system of claim 1 wherein the machine readable instructions configure the processor to determine the parameters immediately prior to injecting the failure scenario into the distributed system.

8. The system of claim 1 wherein the machine readable instructions configure the processor to update the parameters based on feedback from the distributed system after injecting the failure scenario into the distributed system.

9. The system of claim 1 wherein the machine readable instructions configure the processor to determine the parameters based on data collected for corresponding faults.

10. The system of claim 1 wherein the machine readable instructions configure the processor to determine the parameters using parameters of a second distributed system that shares the same operating platform or depends on the same components as the distributed system.

11. A method comprising:
determining, based on a topology of a distributed system, one or more injection points in the distributed system to inject failure scenarios, each failure scenario including one or more faults and parameters for each of the faults;
prioritizing the failure scenarios, wherein prioritizing the failure scenarios is based on a prior use of the failure scenarios in a second distributed system having the topology of the distributed system;
injecting a failure scenario from the prioritized failure scenarios into the distributed system via the one or more injection points;
determining whether the injected failure scenario causes a response of the distributed system to fall below a predetermined level; and
determining resiliency of the distributed system to one or more faults in the injected failure scenario based on whether the injected failure scenario causes the response of the distributed system to fall below the predetermined level.

12. The method of claim 11 further comprising stopping injection of the failure scenario into the distributed system when the injected failure scenario causes an unexpected response from the distributed system.

13. The method of claim 11 further comprising:
determining the topology of the distributed system immediately prior to injecting the failure scenario into the distributed system; and
determining the parameters immediately prior to injecting the failure scenario into the distributed system.

14. The method of claim 11 further comprising prioritizing the failure scenarios based on one or more of an analysis of a prior outage of the distributed system, an analysis of prior normal operation of the distributed system, and prior use of the failure scenarios in a second distributed system having the topology of the distributed system.

15. The method of claim 11 further comprising updating the parameters based on feedback from the distributed system after injecting the failure scenario into the distributed system.

16. The method of claim 11 further comprising:
determining the parameters based on data collected for corresponding faults; or
determining the parameters using parameters of a second distributed system that shares the same operating platform or depends on the same components as the distributed system.

17. A system comprising:
a processor; and
machine readable instructions, stored on a tangible machine readable medium, when executed by the processor, configure the processor to:
determine, based on a topology of a distributed system, one or more injection points in the distributed system to inject failure scenarios, each failure scenario including one or more faults and parameters for each of the faults, wherein:
determining the parameters is based on data collected for corresponding faults; or
determining the parameters is performed using parameters of a second distributed system that shares a same operating platform or that depends on same components as the distributed system;
prioritize the failure scenarios;
inject a failure scenario from the prioritized failure scenarios into the distributed system via the one or more injection points; and
determine resiliency of the distributed system to one or more faults in the injected failure scenario based on whether the injected failure scenario causes a response of the distributed system to fall below a predetermined level.

18. The system of claim 17 wherein the machine readable instructions configure the processor to stop injection of the failure scenario into the distributed system when the injected failure scenario causes an unexpected response from the distributed system.

19. The system of claim 17 wherein the machine readable instructions configure the processor to:
determine the topology of the distributed system immediately prior to injecting the failure scenario into the distributed system; and
determine the parameters immediately prior to injecting the failure scenario into the distributed system.

20. The system of claim 17 wherein the machine readable instructions configure the processor to prioritize the failure scenarios based on an analysis of a prior outage of the distributed system or based on usage of the failure scenarios in a second distributed system having the topology of the distributed system.

* * * * *